(12) United States Patent
AbuGhazaleh

(10) Patent No.: US 10,814,733 B2
(45) Date of Patent: Oct. 27, 2020

(54) ELECTRICAL VEHICLE CHARGER AND INTEGRATED CORD MANAGEMENT SYSTEM

(71) Applicant: Hubbell Incorporated, Shelton, CT (US)

(72) Inventor: Shadi Alex AbuGhazaleh, Guilford, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/848,961

(22) Filed: Dec. 20, 2017

(65) Prior Publication Data

US 2018/0170197 A1  Jun. 21, 2018

Related U.S. Application Data

(60) Provisional application No. 62/436,607, filed on Dec. 20, 2016.

(51) Int. Cl.
| | |
|---|---|
| *B60L 53/16* | (2019.01) |
| *H02G 11/02* | (2006.01) |
| *B60L 53/31* | (2019.01) |
| *B60L 53/18* | (2019.01) |
| *B60L 53/30* | (2019.01) |
| *H02G 3/04* | (2006.01) |

(52) U.S. Cl.
CPC ............... *B60L 53/16* (2019.02); *B60L 53/18* (2019.02); *B60L 53/30* (2019.02); *B60L 53/31* (2019.02); *H02G 11/02* (2013.01); *H02G 3/0493* (2013.01)

(58) Field of Classification Search
CPC .................................................... B60L 11/1818
USPC .......................................................... 320/109
See application file for complete search history.

(56) References Cited

U.S. PATENT DOCUMENTS

| 5,855,262 A | 1/1999 | Jackson | |
|---|---|---|---|
| 2010/0102775 A1* | 4/2010 | Chander | B65H 75/4402 320/109 |
| 2011/0193521 A1* | 8/2011 | Ichikawa | B60L 3/0069 320/109 |
| 2013/0098725 A1 | 4/2013 | Yun | |
| 2014/0097795 A1 | 4/2014 | Turner et al. | |
| 2015/0008878 A1* | 1/2015 | Mizuno | H02J 7/0042 320/109 |
| 2016/0121747 A1* | 5/2016 | Jefferies | H01H 3/16 320/109 |

* cited by examiner

*Primary Examiner* — David V Henze-Gongola
(74) *Attorney, Agent, or Firm* — Michael Best & Friedrich, LLP

(57) ABSTRACT

An electrical vehicle charger and cord management system includes a cord-reel and a charging cord. The cord-reel includes a spool and a reel housing extending from the spool. The spool includes a hub and a cord opening. The reel housing includes a rewind mechanism. A charging cord extends through the cord opening and is removably wound around the hub. An electric vehicle charging system is integrated with the cord-reel.

14 Claims, 4 Drawing Sheets

ELECTRICAL VEHICLE CHARGER AND INTEGRATED CORD MANAGEMENT SYSTEM

RELATED APPLICATION(S)

This application is based on U.S. Provisional Application Ser. No. 62/436,607, filed Dec. 20, 2016, the disclosure of which is incorporated herein by reference in its entirety and to which priority is claimed.

FIELD

Various exemplary embodiments relate to a cord reel for a charging device, for example an electrical vehicle charging station.

BACKGROUND

Charging stations have become more prevalent in residential and commercial locations to supply power to a battery-powered device. Although most commonly associated with electric cars, charging stations can be used for other vehicles such as bikes, mopeds, and motorcycles, or other electric devices such as lawn mowers or other home or yard equipment. Charging stations typically involve a cord or cable for supplying power to a device, for example an AC or DC power supply that is run to an electric device. Typical charging stations involve a rectangular box shaped device that is mounted on a pedestal or a wall where the cord is hung or wrapped around the charger or a bracket located nearby.

SUMMARY

According to an exemplary embodiment, an electrical vehicle charger and cord management system includes a cord-reel and a charging cord. The cord-reel includes a spool and a reel housing extending from the spool. The spool includes a hub and a cord opening. The reel housing includes a rewind mechanism. A charging cord extends through the cord opening and is removably wound around the hub. An electric vehicle charging system is integrated with the cord-reel.

According to another exemplary embodiment, an electrical vehicle charger and cord management system includes a charger housing containing an electric vehicle charging system. A mounting bracket is connected to charger housing. A cord-reel extends from the charger housing. The cord reel includes a spool and a reel housing extending from the spool. The spool includes a hub and a cord opening. The reel housing includes a rewind mechanism. A charging cord extends through the cord opening and is removably wound around the hub.

According to another exemplary embodiment, an electrical vehicle charger and cord management system includes a cord-reel and a charging cord. The cord-reel includes a spool and a reel housing extending from the spool. The spool includes a hub and a cord opening. The reel housing includes a rewind mechanism. A mounting bracket is connected to the cord-reel. A charging cord extends through the cord opening and is removably wound around the hub. An electric vehicle charging system positioned in the reel housing.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
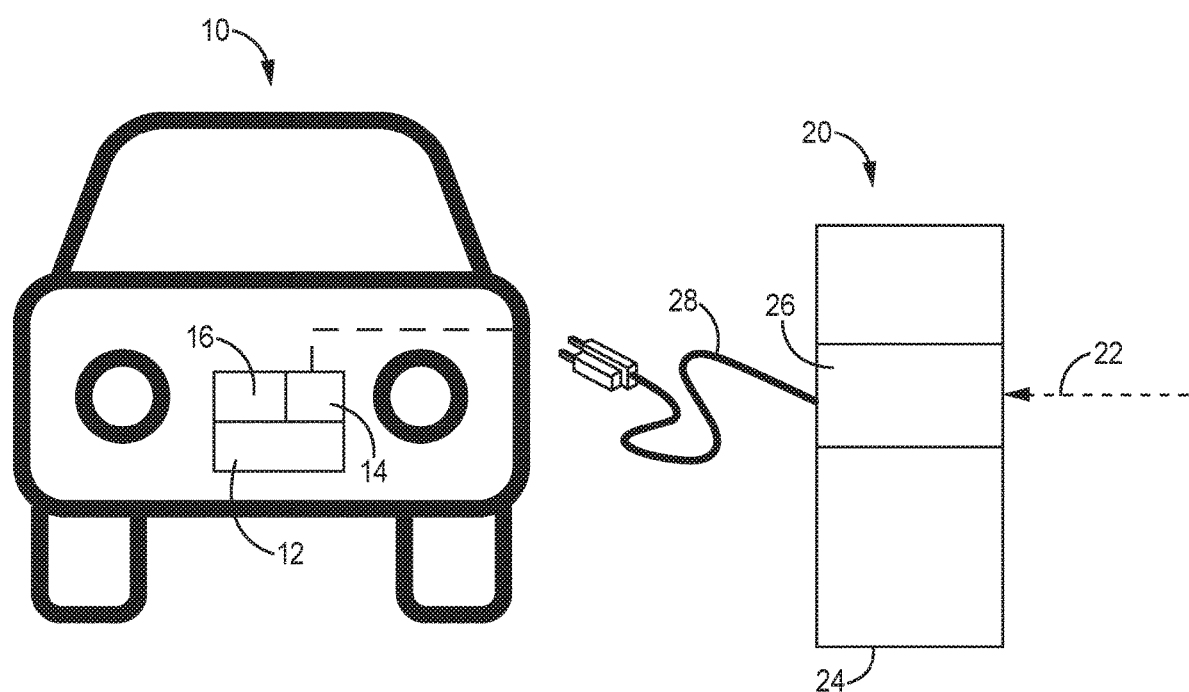
FIG. 1 is a schematic diagram of an electric vehicle and charging station.

FIG. 1 shows a diagram of an electric vehicle or device 10 (represented here as a car) having one or more batteries 12 (for example a battery array), an on-board charging system 14, and a batter management system 16 used to charge the batteries 12. The battery management system 16 can monitor the battery parameters, such as voltage, current, temperature, charge rate, and discharge rate to help control the charging, and can also provide safety functions if one or more limits are exceeded. A charging station 20 is used to charge the battery and includes a power supply 22, a housing 24, a station charging system 26, and a charging cable 28. Communication can be provided between the battery management system 16 and the on-bard charging system 14 and/or the station charging system 26.

The power supply 22 can be from an AC supply grid. The batteries 12 store energy in DC form, requiring a conversion either on board the electric device 10, for example in the on-board charging system 14 or in the station charging system 26. Different standards have been developed for these different applications.

For example, level 1 (120 VAC at 15 A-20 A) and level 2 (240 VAC at 40 A) electric vehicle (EV) chargers are configured to supply AC power to the electric device 10. The station charging system 26 can therefore include different hardware and software to perform filtering (such as a power converter or power factor correction) and supply a fixed AC power supply to the on-board charging system 14 through the charging cable 28. The on-board charging system 14 can include a rectifier to convert the AC input into DC and additional hardware and software components to regulate and control the DC power supplied to the batteries 12. Level 3 EV chargers supply DC power from the charging station 20. The station charging system therefore includes the necessary hardware and software components to convert the power supply to a DC output and to perform the necessary power conditioning. The station charging system 26 can also include different hardware and software to perform safety functions, such as ground-fault sensing, circuit interrupting, safety interlock switches, and isolators.

Figure 2:
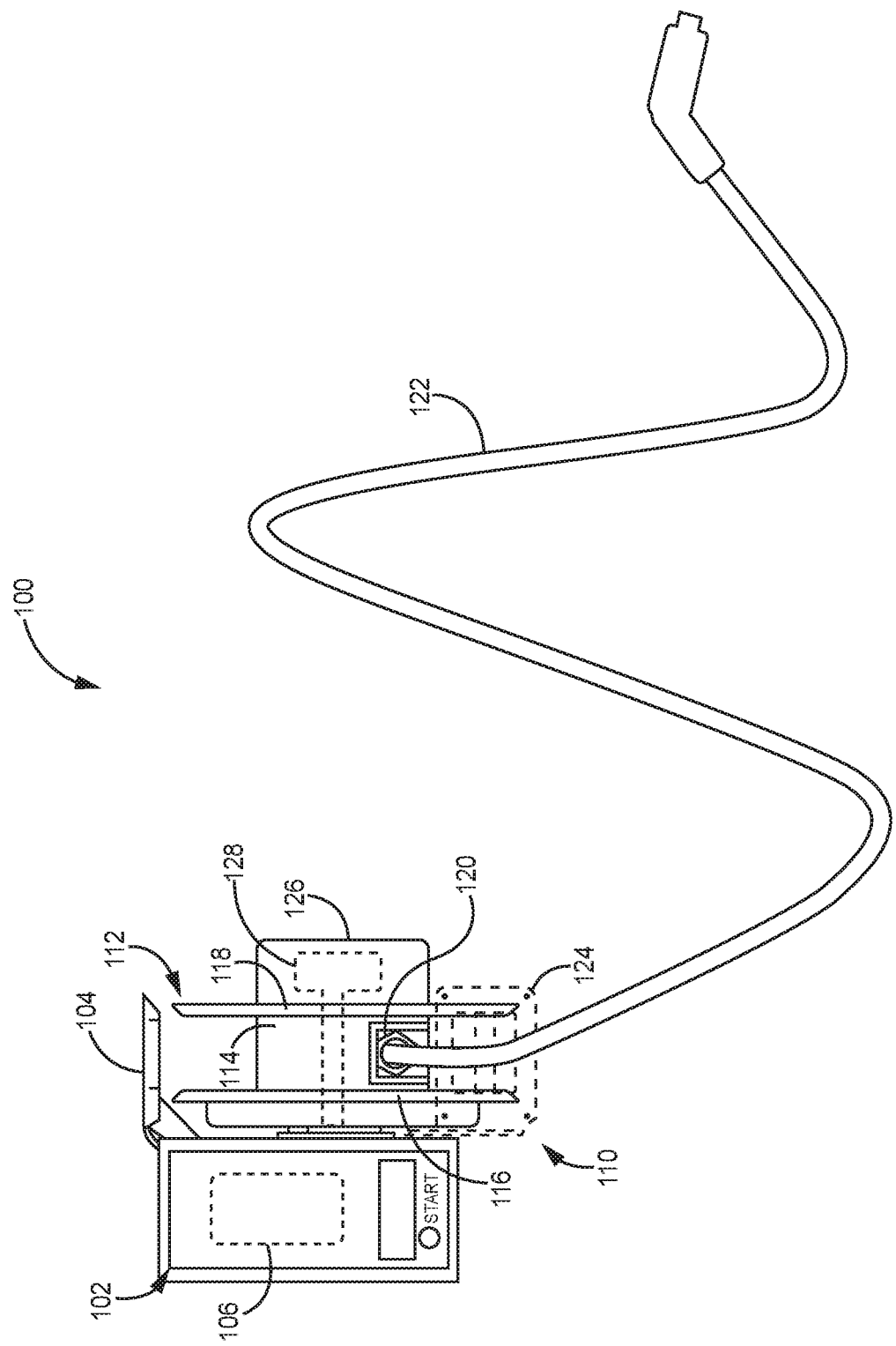
FIG. 2 is front view of an exemplary charger integrated cord-reel.
Figure 3:
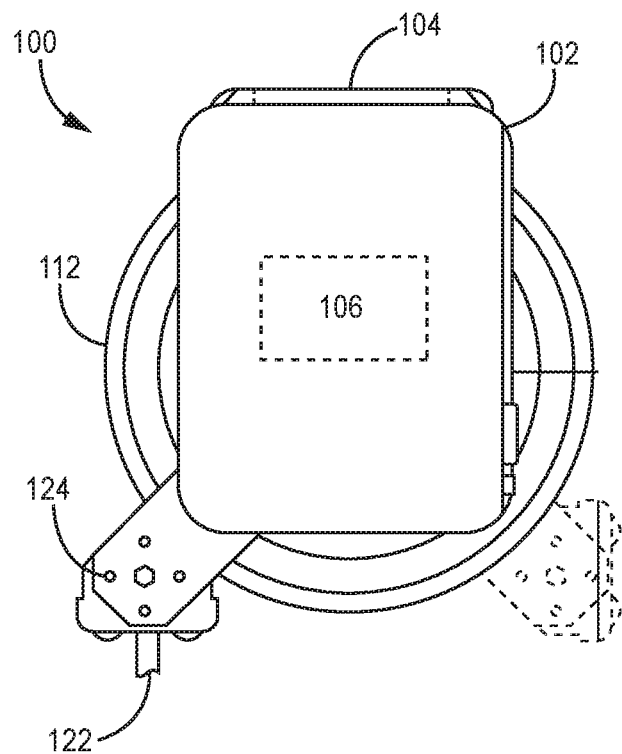
FIG. 3 is a side view of the charger integrated cord-reel of FIG. 2 without the cord.
Figure 4:
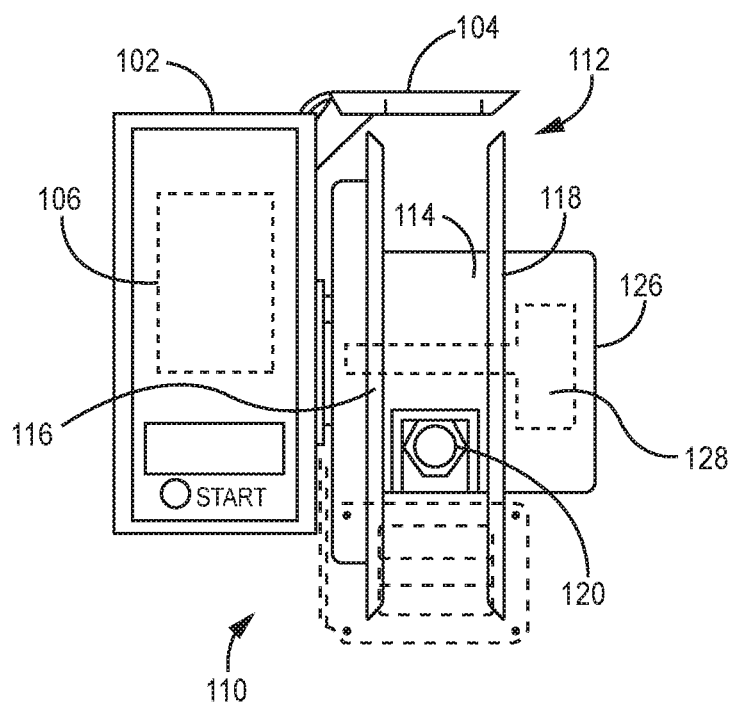
FIG. 4 is a front view of the charger integrated cord-reel of FIG. 3.

Various exemplary embodiments are directed to a cord-reel that integrates EV charging circuitry into the enclosure of the cord-reel. FIGS. 2-4 show an exemplary embodiment of a charger integrated cord-reel 100 having a charger housing 102 and a mounting bracket 104. The charger housing 102 can contain a station charging system 106 with the necessary components to supply power to an EV or other electrical device. As discussed above, the exact components of the charging system 106 can vary as would be understood by one of ordinary skill in the art. The mounting bracket 104 can be configured to connect the charger integrated cord-reel 100 to a structure, for example a wall or other surface in a residential application or a pedestal or other support in a commercial application.

A cord-reel 110 extends from the charger housing 102. The cord-reel 110 includes a spool 112 having a cylindrical hub 114, a first side wall 116, and a second side wall 118. A cord outlet 120 is positioned in the hub through which a charging cord 122 extends. FIG. 2 shows the cord 122 in a retracted position. When not in use, the cord 122 is wound around the hub 114. The cord 122 can be different gauges as needed for the application and end with an appropriate charging plug.

In various exemplary embodiments, a cord bracket 124 can be moveably connected to the hub 114. Although not shown in FIG. 2, the cord 122 extends through an opening in the cord bracket 124 so that at least a portion of the cord 122 is spaced from the hub 114 at all times, allowing a user to more easily access the end of the cord 122 and to remove the cord from the hub 114 at different angles. The bracket 124 can be rotated through a variety of positions as shown.

A reel housing 126 can extend from the hub 114 or through the center of the hub 114. In certain embodiments, the hub 114 is rotatable on the reel housing 126. The reel housing 126 can contain a rewind mechanism 128 which can be a powered or automatic mechanism, a manual mechanism, or a biasing member such as a return spring, torsion springs, or slip ring assembly. Additional charging and safety components can also be incorporated in the charger integrated cord-reel 100.

In various exemplary embodiments, the charger integrated cord-reel 100 includes a user interface/display 130 (LCD or distinct indicator lights) to provide feedback to the user on the status of the charging, and provide indication of errors or conditions that require user attention. A communications interface can also be included, for example a wired connection (such as an RJ45) or wireless communication interface. All or part of the enclosure can be made of non-conductive materials (such as molded plastic) to allow for the wireless transmission. If a metallic enclosure is used, it can have an aperture that allows an antenna to exit the unit or can have a portion or side made out of a material than can allow the wireless transmission. All or part of the enclosure can be made of non-conductive materials (such as molded plastic) to allow for the wireless transmission. If a metallic enclosure is used, it can have an aperture that allows an antenna to exit the unit or can have a portion or side made out of a material than can allow the wireless transmission. The embodiments in FIGS. 2-6 show an example based on a metallic open cord-reel, however any type of cord-reel cam ne used.

Figure 5:
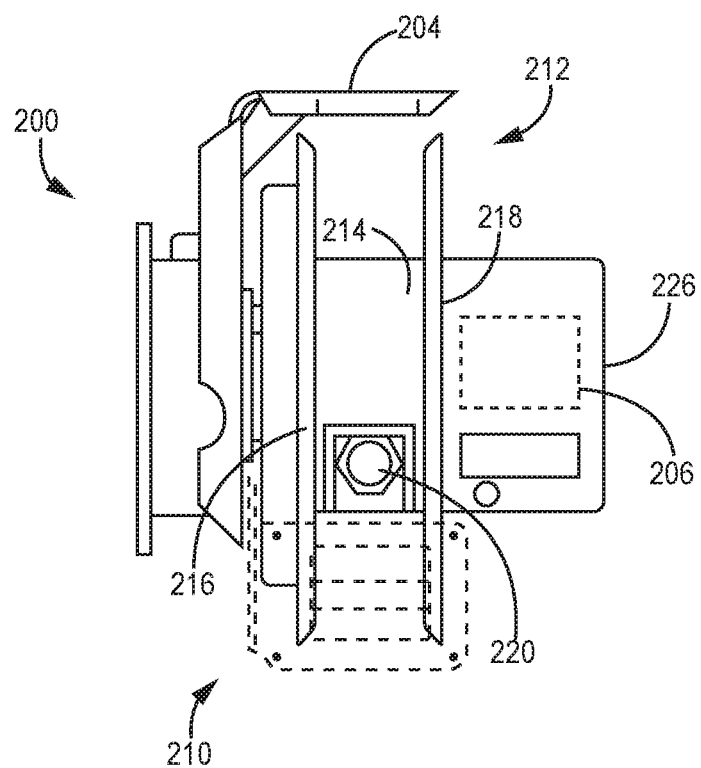
FIG. 5 is a front view of another exemplary charger integrated cord-reel.

FIG. 5 shows another exemplary embodiment of a charger integrated cord-reel 200 having a cord-reel 210 that includes a spool 212 having a cylindrical hub 214, a first side wall 216, and a second side wall 218. A cord outlet 220 is positioned in the hub 214 through which a charging cord (not shown) extends. A reel housing 226 can extend from or through the hub 214. In this exemplary embodiment, the station charging system 206 is integrated into the reel housing 226. In this embodiment the reel housing 226 is expanded in length to accommodate the extra components.

Figure 6:
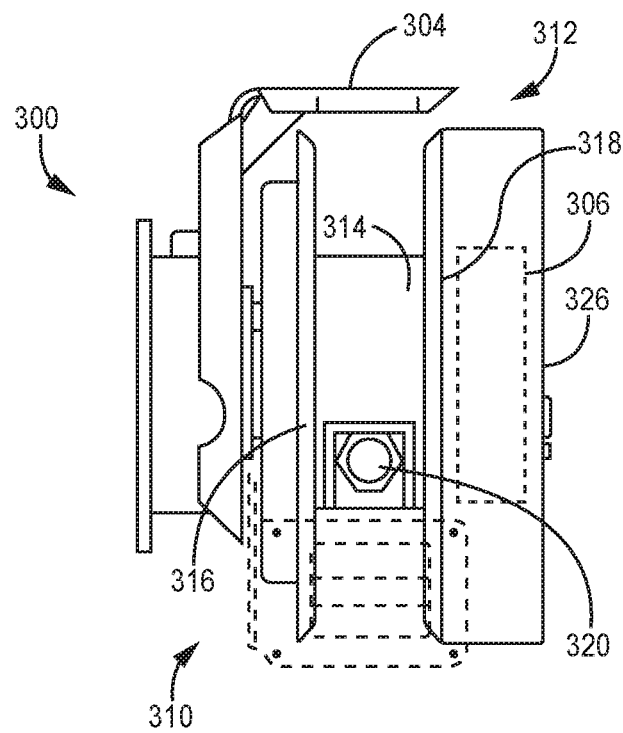
FIG. 6 is a front view of another exemplary charger integrated cord-reel.

FIG. 6 shows another exemplary embodiment of a charger integrated cord-reel 300 having a cord-reel 310 that includes a spool 312 having a cylindrical hub 314, a first side wall 316, and a second side wall 318. A cord outlet 320 is positioned in the hub 314 through which a charging cord (not shown) extends. A reel housing 326 can extend from or through the hub 314. In this exemplary embodiment, the station charging system 306 is integrated into the reel housing 326. In this embodiment the reel housing 326 is expanded in diameter to accommodate the extra components.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An electrical vehicle charger and cord management system comprising:
a cord-reel including a spool and a reel housing extending from the spool, the spool including a hub having an outer surface for receiving a wound charging cord and a cord opening, and the reel housing including a rewind mechanism;
a charging cord extending through the cord opening and removably wound around the hub; and
an electric vehicle charging system integrated with the cord-reel,
wherein the outer surface of the hub is positioned externally of the electric vehicle charging system and the reel housing,
wherein the electric vehicle charging system is positioned in the reel housing.

2. The charger and cord management system of claim 1, wherein the reel housing has a length greater than the hub to accommodate the electric vehicle charging system.

3. The charger and cord management system of claims, wherein the reel housing has a diameter greater than the hub to accommodate the electric vehicle charging system.

4. The charger and cord management system of claim 1, further comprising a user interface operatively connected to a station charging system.

5. The charger and cord management system of claim 1, further comprising a cord bracket moveably connected to the hub and having a bracket opening receiving the cord.

6. The integrated charger and cord management system of claim 5, wherein the cord bracket is rotatable with respect to the charger housing.

7. The integrated charger and cord management system of claim 1, wherein the spool includes a first side wall extending from the hub and a second side wall extending from the hub.

8. The integrated charger and cord management system of claim 1, wherein the cord is moveable from a retracted position to an extended position.

9. The integrated charger and cord management system of claim 8, wherein the rewind mechanism is configured to return the cord to the retracted position from the extended position.

10. An electrical vehicle charger and cord management system comprising:
- a cord-reel including a spool and a reel housing extending from the spool, the spool including a hub having an outer surface for receiving a wound charging cord and a cord opening, and the reel housing including a rewind mechanism;
- a mounting bracket connected to the cord-reel;
- a charging cord extending through the cord opening and removably wound around the hub; and
- an electric vehicle charging system positioned in the reel housing,
- wherein the outer surface of the hub is positioned externally of the electric vehicle charging system and the reel housing.

11. The charger and cord management system of claim 10, wherein the reel housing has a length greater than the hub.

12. The charger and cord management system of claim 10, wherein the reel housing has a diameter greater than the hub.

13. The charger and cord management system of claim 10, further comprising a user interface operatively connected to a station charging system.

14. The charger and cord management system of claim 10, further comprising a cord bracket moveably connected to the hub and having a bracket opening receiving the cord.

* * * * *